US012274667B1

(12) United States Patent
He et al.

(10) Patent No.: US 12,274,667 B1
(45) Date of Patent: Apr. 15, 2025

(54) METHOD AND APPARATUS FOR IDENTIFYING BACK ACUPUNCTURE POINTS, AND MOXIBUSTION ROBOT

(71) Applicant: Jianghan University, Wuhan (CN)

(72) Inventors: Qiang He, Wuhan (CN); Jing Wang, Wuhan (CN); Hongxing Zhang, Wuhan (CN); Qian Tu, Wuhan (CN)

(73) Assignee: Jianghan University, Wuhan (CN)

( * ) Notice: Subject to any disclaimer, the term of this patent is extended or adjusted under 35 U.S.C. 154(b) by 0 days.

(21) Appl. No.: 18/944,702

(22) Filed: Nov. 12, 2024

(30) Foreign Application Priority Data

Jun. 18, 2024 (CN) ......................... 202410785069.3

(51) Int. Cl.
*A61H 39/02* (2006.01)

(52) U.S. Cl.
CPC .................................... *A61H 39/02* (2013.01)

(58) Field of Classification Search
CPC ................................ A61H 39/02; A61H 39/00
See application file for complete search history.

(56) References Cited

U.S. PATENT DOCUMENTS

2014/0214124 A1* 7/2014 Greiner .............. A61N 1/37223
607/129

FOREIGN PATENT DOCUMENTS

CN 118356344 B 9/2024

OTHER PUBLICATIONS

First Office Action, issued by National Intellectual Property Administration of the People's Republic of China, CN App. 202410785069.3, issued Jul. 25, 2024.

* cited by examiner

*Primary Examiner* — Christopher Wait
(74) *Attorney, Agent, or Firm* — Thomas Horstemeyer, LLP

(57) ABSTRACT

A method and apparatus for identifying back acupuncture points, and a moxibustion robot are provided, which belong to the technical field of identification of acupuncture points. The method includes: acquiring skeleton key feature points of a human body image, and identifying a plurality of back meridians on a back based on the skeleton key feature points; identifying a plurality of thoracic vertebra positions and a plurality of lumbar vertebra positions of the human body image based on the skeleton key feature points; and identifying back acupuncture points based on the plurality of thoracic vertebra positions, the plurality of lumbar vertebra positions, and the back meridians. Manual marking is not required, and the thoracic vertebra positions and the lumbar vertebra positions are used as references for the back acupuncture points. The accuracies of the identified back acupuncture points are improved.

7 Claims, 5 Drawing Sheets

METHOD AND APPARATUS FOR IDENTIFYING BACK ACUPUNCTURE POINTS, AND MOXIBUSTION ROBOT

CROSS REFERENCE TO RELATED APPLICATION

This patent application claims the benefit and priority of Chinese Patent Application No. 202410785069.3, filed with the China National Intellectual Property Administration on Jun. 18, 2024, the disclosure of which is incorporated by reference herein in its entirety as part of the present application.

TECHNICAL FIELD

The present disclosure relates to the technical field of identification of acupuncture points, and in particular, to a method and apparatus for identifying back acupuncture points, and a moxibustion robot.

BACKGROUND

As people are paying increasing attention to the physical health, an increasing number of people select moxibustion as a treatment therapy for physical complaints. Moxibustion, as a Chinese traditional medical treatment therapy, has been passed down to now, and a plurality of acupuncture and moxibustion techniques have been derived.

In existing mainstream methods for locating meridians and acupuncture points, a deep learning model is trained with a dataset of manually marked meridians and acupuncture points to realize the locating of the meridians and the acupuncture points. These methods have the following shortcomings: 1. Manually marking acupuncture points needs to be done by specialized persons and takes a lot of time and energy. There may be a subjective error in a marking process, which affects the quality of data. 2. Salaries of the specialized persons and possible device costs need to be paid, and the costs are high. 3. Different marking persons may have different standards and understandings, resulting in inconsistency of marking results and affecting the accuracy of the model. 4. Limited by data acquisition, it may be unable to obtain acupuncture point data which is diversified and comprehensive enough, affecting the generalization capability of the model. 5. Mistakes may inevitably occur in a manual marking process. These mistakes might affect the training effect and performance of the model. 6. When a new acupuncture point needs to be added or a marking manner needs to be adjusted, a lot of manual marking work needs to be done again. Consequently, the workload and the cost are increased.

Therefore, there is an urgent need to a method and apparatus for identifying back acupuncture points, a moxibustion robot, and a storage medium to address a plurality of problems in a process of identifying and locating back acupuncture points caused by replying on manually marking acupuncture points and meridians.

SUMMARY

In view of the above, it is necessary to provide a method and apparatus for identifying back acupuncture points, and a moxibustion robot to address the technical problems of low accuracy and efficiency and high cost of locating back acupuncture points caused by replying on manually marking acupuncture points and meridians in the prior art.

In an aspect, the present disclosure provides a method for identifying back acupuncture points, including:

- acquiring skeleton key feature points of a human body image, and identifying a plurality of back meridians on a back based on the skeleton key feature points;
- identifying a plurality of thoracic vertebra positions and a plurality of lumbar vertebra positions of the human body image based on the skeleton key feature points; and
- identifying back acupuncture points based on the plurality of thoracic vertebra positions, the plurality of lumbar vertebra positions, and the back meridians.

In some possible implementations, the skeleton key feature points include a left acromion, a right acromion, a left hip point, and a right hip point; the back meridians include the Governing Vessel, an inner bladder meridian of foot-taiyang, and an outer bladder meridian of foot-taiyang; and the identifying a plurality of back meridians on a back based on the skeleton key feature points includes:

- identifying a first midpoint between the left acromion and the right acromion and a second midpoint between the left hip point and the right hip point;
- taking a connecting line of the first midpoint and the second midpoint as the Governing Vessel; and
- identifying the inner bladder meridian of foot-taiyang and the outer bladder meridian of foot-taiyang based on a topological relationship of the Governing Vessel with the inner bladder meridian of foot-taiyang and the outer bladder meridian of foot-taiyang.

In some possible implementations, the topological relationship includes a first distance relationship between the Governing Vessel and the inner bladder meridian of foot-taiyang and a second distance relationship between the Governing Vessel and the outer bladder meridian of foot-taiyang; and the identifying the inner bladder meridian of foot-taiyang and the outer bladder meridian of foot-taiyang based on a topological relationship of the Governing Vessel with the inner bladder meridian of foot-taiyang and the outer bladder meridian of foot-taiyang includes:

- acquiring an actual pixel distance and a theoretic distance between the left acromion and the right acromion;
- identifying a horizontal cun based on the actual pixel distance and the theoretic distance;
- separately adjusting the first distance relationship and the second distance relationship based on the horizontal cun to correspondingly obtain a first calibration relationship and a second calibration relationship; and
- identifying the inner bladder meridian of foot-taiyang based on the first calibration relationship, and identifying the outer bladder meridian of foot-taiyang based on the second calibration relationship.

In some possible implementations, the skeleton key feature points further include a left nipple, a right nipple, a left elbow tip, and a right elbow tip; the human body image includes 12 thoracic vertebrae of the back of the human body; and the identifying a plurality of thoracic vertebra positions of the human body image based on the skeleton key feature points includes:

- establishing a first positional association relationship based on an association relationship between a plurality of thoracic vertebrae;
- establishing a second positional association relationship based on an association relationship of the left nipple, the right nipple, the left elbow tip, and the right elbow tip with the thoracic vertebrae; and identifying the plurality of thoracic vertebra positions based on the first positional association relationship and the second positional association relationship.

In some possible implementations, the first positional association relationship is as follows:

$$B+(B+S)+(B+2S)+\ldots+(B+6S)=(B+7S)+(B+8S)+(B+9S)+(B+11S)$$

the second positional association relationship is as follows:

$$(B+6S)+(B+7S)+(B+8S)+(B+9S)+(B+10S)=D$$

where B represents a length of a first thoracic vertebra; S represents length difference between two adjacent thoracic vertebrae; and D represents a distance between a midpoint of a connecting line of the left nipple and the right nipple and a midpoint of a connecting line of the left elbow tip and the right elbow tip.

In some possible implementations, the skeleton key feature points further include a navel; the human body image includes 5 lumbar vertebrae of the back of the human body; and the identifying a plurality of lumbar vertebra positions of the human body image based on the skeleton key feature points includes:

acquiring correspondences of the navel with the lumbar vertebrae, and identifying the plurality of lumbar vertebra positions based on the correspondences.

In some possible implementations, before the identifying back acupuncture points based on the plurality of thoracic vertebra positions, the plurality of lumbar vertebra positions, and the back meridians, the method further includes:

acquiring validation feature points, where the validation feature points include a xiphoid and a jugular notch; and validating accuracies of the plurality of thoracic vertebra positions and the plurality of lumbar vertebra positions based on the validation feature points.

In some possible implementations, the identifying back acupuncture points based on the plurality of thoracic vertebra positions, the plurality of lumbar vertebra positions, and the back meridians includes:

acquiring mapping relationships of the back acupuncture points with the plurality of thoracic vertebra positions, the plurality of lumbar vertebra positions, and the back meridians, and identifying the back acupuncture points based on the mapping relationships.

In another aspect, the present disclosure further provides an apparatus for identifying back acupuncture points, including:

a back meridian identification unit configured to acquire skeleton key feature points of a human body image, and identify a plurality of back meridians on a back based on the skeleton key feature points;

a thoracic and lumbar vertebra position identification unit configured to identify a plurality of thoracic vertebra positions and a plurality of lumbar vertebra positions of the human body image based on the skeleton key feature points; and a back acupuncture point identification unit configured to identify back acupuncture points based on the plurality of thoracic vertebra positions, the plurality of lumbar vertebra positions, and the back meridians.

In another aspect, the present disclosure further provides a moxibustion robot, including an acupuncture point location subsystem for identifying back acupuncture points and a moxibustion implementation subsystem for applying moxibustion based on the back acupuncture points, where the acupuncture point location subsystem includes a memory and a processor;

the memory is configured to store a program; and the processor is coupled with the memory and configured to execute the program stored in the memory to implement the steps of the method for identifying back acupuncture points in any of the above possible implementations.

The above embodiments have the following beneficial effects: the method for identifying back acupuncture points provided in the present disclosure can acquire the skeleton key feature points of the human body image and identify the back acupuncture points based on the skeleton key feature points. There is no need to manually mark the back meridians, and the technical problems of low accuracy and efficiency and high marking cost of the back meridians caused by manually marking the back meridians are solved. Further, in the present disclosure, the plurality of thoracic vertebra positions and the plurality of lumbar vertebra positions are identified based on the skeleton key feature points, and the back acupuncture points are identified based on the thoracic vertebra positions, the lumbar vertebra positions, and the back meridians. The thoracic vertebra positions and the lumbar vertebra positions are used as references for the back acupuncture points so that the accuracy of the identified back acupuncture points can be further improved.

Further, the present disclosure can realize locating of acupuncture points by only identifying accurate skeleton key feature points. Compared with numerous back acupuncture points without obvious features, there are few accurate skeleton key feature points which can be identified more easily. Therefore, the present disclosure further improves the accuracy and efficiency of identifying the back acupuncture points.

BRIEF DESCRIPTION OF THE DRAWINGS

In order to describe the technical solutions in the embodiments of the present invention more clearly, the accompanying drawings required to describe the embodiments are briefly described below. Apparently, the accompanying drawings in the following description show merely some embodiments of the present disclosure, and those skilled in the art may still derive other accompanying drawings from these accompanying drawings without creative efforts.

DETAILED DESCRIPTION OF THE EMBODIMENTS

The technical solutions in the embodiments of the present disclosure will be described clearly and completely with reference to the accompanying drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

It should be understood that the schematic accompanying drawings are not drawn based on a scale of a real object. The flowcharts used in the present disclosure show the operations implemented according to some embodiments of the present disclosure. It should be understood that the operations in the flowcharts may be performed out of sequence, and the steps without a logical context relationship may be performed in a reverse sequence or at the same time. Moreover, those skilled in the art may add one or more other operations to the flowcharts or remove one or more operations from the flowcharts based on the content of the present disclosure. Some of the block diagrams shown in the accompanying drawings are functional entities, and do not necessarily correspond to physically or logically independent entities. These functional entities may be implemented in the form of software, or implemented in one or more hardware modules or integrated circuits, or implemented in different networks and/or processor systems and/or microcontroller systems.

The terms such as “first”, “second”, and the like described in the embodiments of the present disclosure are used only for the purpose of description and cannot be construed as indicating or implying relative importance, or implicitly indicating the number of the indicated technical features. Therefore, technical features defined by “first” and “second” may explicitly or implicitly include at least one of the features.

When an “embodiment” is mentioned herein, specific features, structures, or characteristics described in conjunction with the embodiment may be included in at least one embodiment of the present disclosure. The term appearing in different parts of the specification does not necessarily refer to the same embodiment or an independent or alternative embodiment exclusive of other embodiments. It may be explicitly or implicitly appreciated by those skilled in the art that the embodiments described herein may be combined with other embodiments.

The present disclosure provides a method for identifying back acupuncture points, and a moxibustion robot, which will be separately described below.

Figure 1:
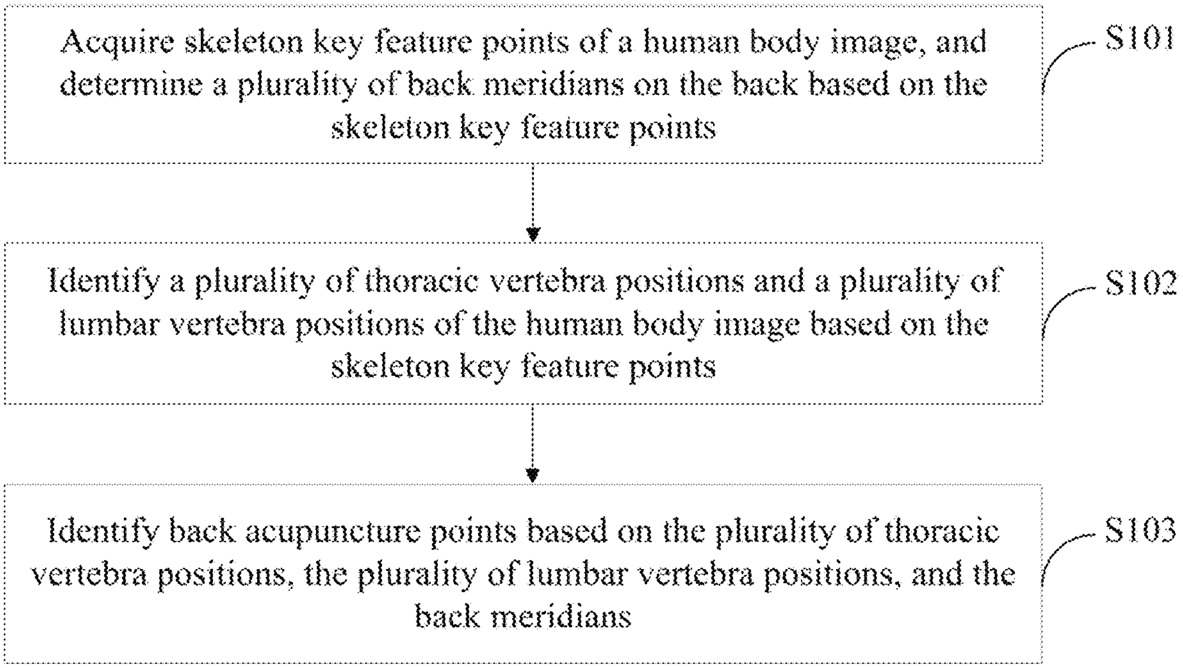
FIG. 1 is a flowchart of one embodiment of a method for identifying back acupuncture points provided by the present disclosure.

FIG. 1 is a flowchart of one embodiment of a method for identifying back acupuncture points provided by an embodiment of the present disclosure. As shown in FIG. 1, the method for identifying back acupuncture points includes the following steps.

In step S101, skeleton key feature points of a human body image are acquired, and a plurality of back meridians on a back are identified based on the skeleton key feature points.

In step S102, a plurality of thoracic vertebra positions and a plurality of lumbar vertebra positions of the human body image are identified based on the skeleton key feature points.

In step S103, back acupuncture points are identified based on the plurality of thoracic vertebra positions, the plurality of lumbar vertebra positions, and the back meridians.

The human body image in step S101 may be acquired in the following manners: the human body image is shot by an image acquisition device (e.g., a camera) in real time; or the human body image is fetched from a storage medium storing pre-shot human body images.

It needs to be noted that the skeleton key feature points in step S101 are acquired in the following two ways: one is to extract the skeleton key feature points by an open-source Mediapipe extraction model, and the other one is to extract key points by an established and trained feature point extraction model.

This is because the open-source Mediapipe extraction model can extract 33 skeleton key points of the human body. The skeleton key feature points are identified by the open-source Mediapipe extraction model that is used directly without training so that the efficiency of identifying the skeleton key feature points can be improved. Further, the Mediapipe extraction model is trained and validated with a large quantity of sample data and has high accuracy. Therefore, the accuracy of the identified skeleton key feature points can be improved.

For the skeleton key feature points that cannot be extracted by the Mediapipe extraction model, the feature point extraction model is established and trained, and the skeleton key feature points are extracted by the feature point extraction model.

The feature point extraction model may be any of existing deep learning models, such as Faster-CNN, SSD, and YOLO. In a specific embodiment of the present disclosure, the feature point extraction model is YOLOv8.

The two ways of acquiring the skeleton key feature points can ensure that all desired skeleton key feature points can be acquired accurately, thereby guaranteeing the accuracy of the back acupuncture points.

Compared with the prior art, the method for identifying back acupuncture points provided in the embodiments of the present disclosure can acquire the skeleton key feature points of the human body image and identify the back acupuncture points based on the skeleton key feature points. There is no need to manually mark the back meridians, and the technical problems of low accuracy and efficiency and high marking cost of the back meridians caused by manually marking the back meridians are solved. Further, in the embodiments of the present disclosure, the plurality of thoracic vertebra positions and the plurality of lumbar vertebra positions are identified based on the skeleton key feature points, and the back acupuncture points are identified based on the thoracic vertebra positions, the lumbar vertebra positions, and the back meridians. The thoracic vertebra positions and the lumbar vertebra positions are used as references for the back acupuncture points so that the accuracy of the identified back acupuncture points can be further improved.

Further, the embodiments of the present disclosure can realize locating of acupuncture points by only identifying accurate skeleton key feature points. Compared with numerous back acupuncture points without obvious features, there are few accurate skeleton key feature points which can be identified more easily. Therefore, the present disclosure further improves the accuracy and efficiency of identifying the back acupuncture points.

Figure 2:
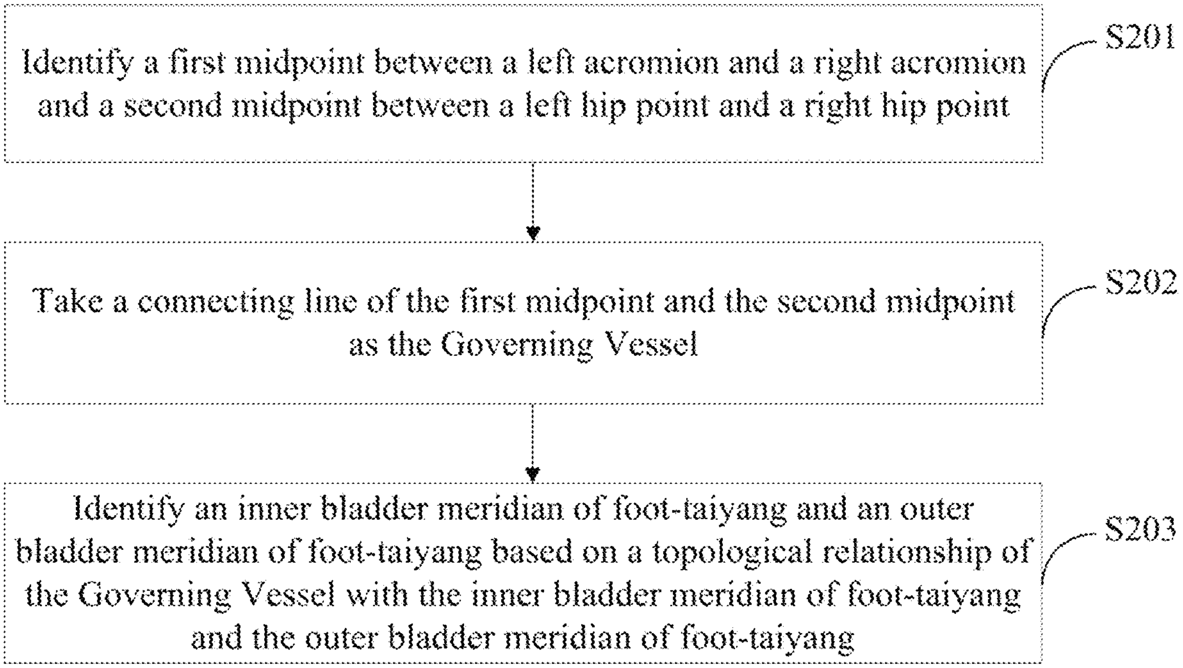
FIG. 2 is a flowchart of one embodiment of identifying back meridians in S101 in FIG. 1 of the present disclosure.

In some embodiments of the present disclosure, the skeleton key feature points include a left acromion, a right acromion, a left hip point, and a right hip point; the back meridians include a Governing Vessel, an inner bladder meridian of foot-taiyang, and an outer bladder meridian of foot-taiyang; and as shown in FIG. 2, identifying the plurality of back meridians on the back based on the skeleton key feature points in step S101 includes the following steps.

In step S201, a first midpoint between the left acromion and the right acromion and a second midpoint between the left hip point and the right hip point are identified.

In step S202, a connecting line of the first midpoint and the second midpoint is taken as the Governing Vessel.

In step S203, the inner bladder meridian of foot-taiyang and the outer bladder meridian of foot-taiyang are identified based on a topological relationship of the Governing Vessel with the inner bladder meridian of foot-taiyang and the outer bladder meridian of foot-taiyang.

Since the human body image is an image shot by the camera and not a real human body, when identifying the Governing Vessel, the inner bladder meridian of foot-taiyang, and the outer bladder meridian of foot-taiyang, a conversion relationship between a real human body size and an image size needs to be taken into account so as to realize accurate identification of the meridians.

Figure 3:
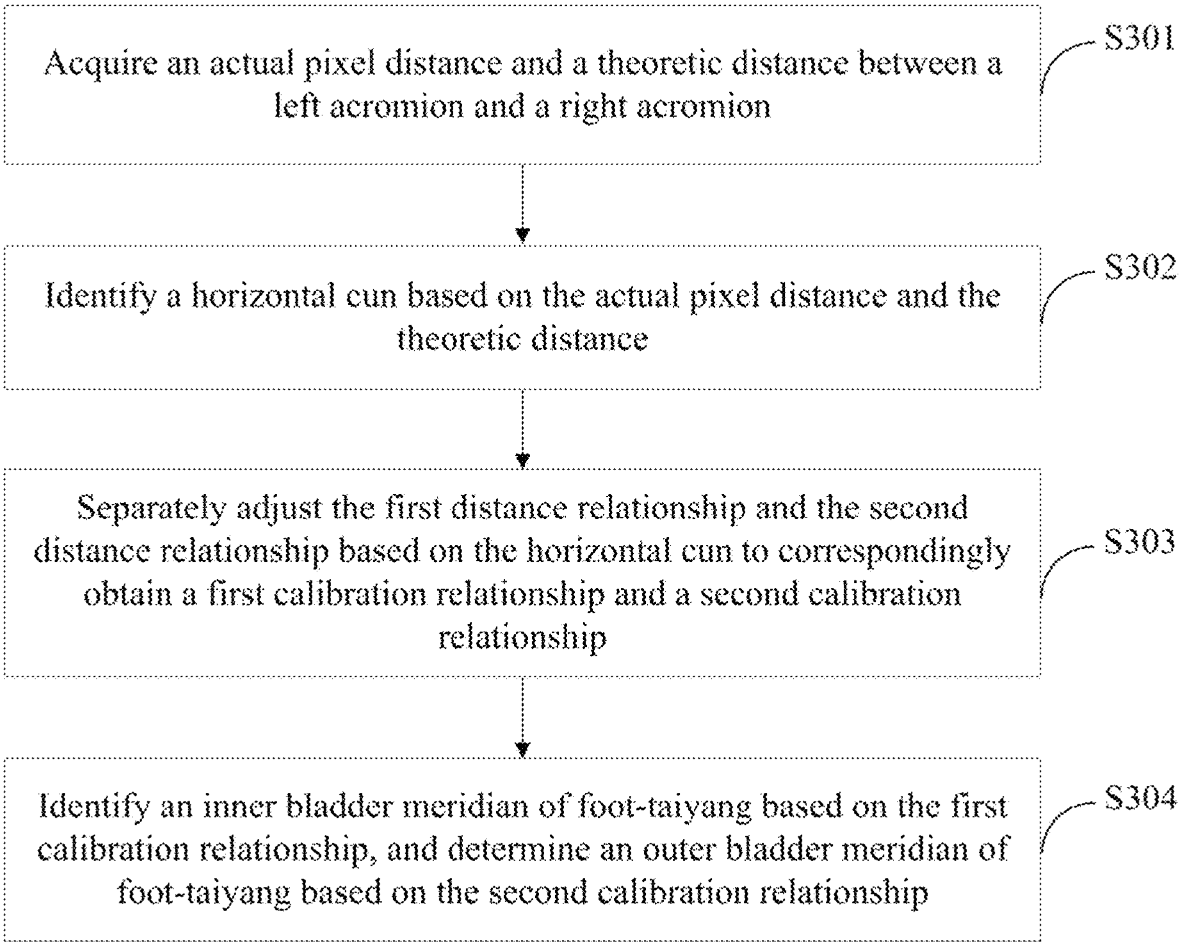
FIG. 3 is a flowchart of one embodiment of S203 in FIG. 2 of the present disclosure.

Specifically, the topological relationship includes a first distance relationship between the Governing Vessel and the inner bladder meridian of foot-taiyang and a second distance relationship between the Governing Vessel and the outer bladder meridian of foot-taiyang. As shown in FIG. 3, step S203 includes the following steps.

In step S301, an actual pixel distance and a theoretic distance between the left acromion and the right acromion are acquired.

In step S302, a horizontal cun is identified based on the actual pixel distance and the theoretic distance.

In step S303, the first distance relationship and the second distance relationship are separately adjusted based on the horizontal cun to correspondingly obtain a first calibration relationship and a second calibration relationship.

In step S304, the inner bladder meridian of foot-taiyang is identified based on the first calibration relationship, and the outer bladder meridian of foot-taiyang is identified based on the second calibration relationship.

The theoretic distance between the left acromion and the right acromion is 16 cun, and the actual pixel distance is 174 px, and the horizontal cun is w=174/16 px=10.86 px. Then, the following equations can be derived:

$$\text{First calibration relationship}=10.86\times\text{first distance relationship; and}$$

$$\text{Second calibration relationship}=10.86\times\text{second distance relationship.}$$

In a specific embodiment of the present disclosure, the inner bladder meridian of foot-taiyang includes a left inner bladder meridian of foot-taiyang and a right inner bladder meridian of foot-taiyang. The outer bladder meridian of foot-taiyang includes a left outer bladder meridian of foot-taiyang and a right outer bladder meridian of foot-taiyang. Left and right meridians are symmetrical about the Governing Vessel.

Furthermore, the first distance relationship is that the distance between the inner bladder meridian of foot-taiyang and the Governing Vessel is 1.5 cun, and the second distance relationship is that the distance between the outer bladder meridian of foot-taiyang and the Governing Vessel is 3 cun.

Figure 4:
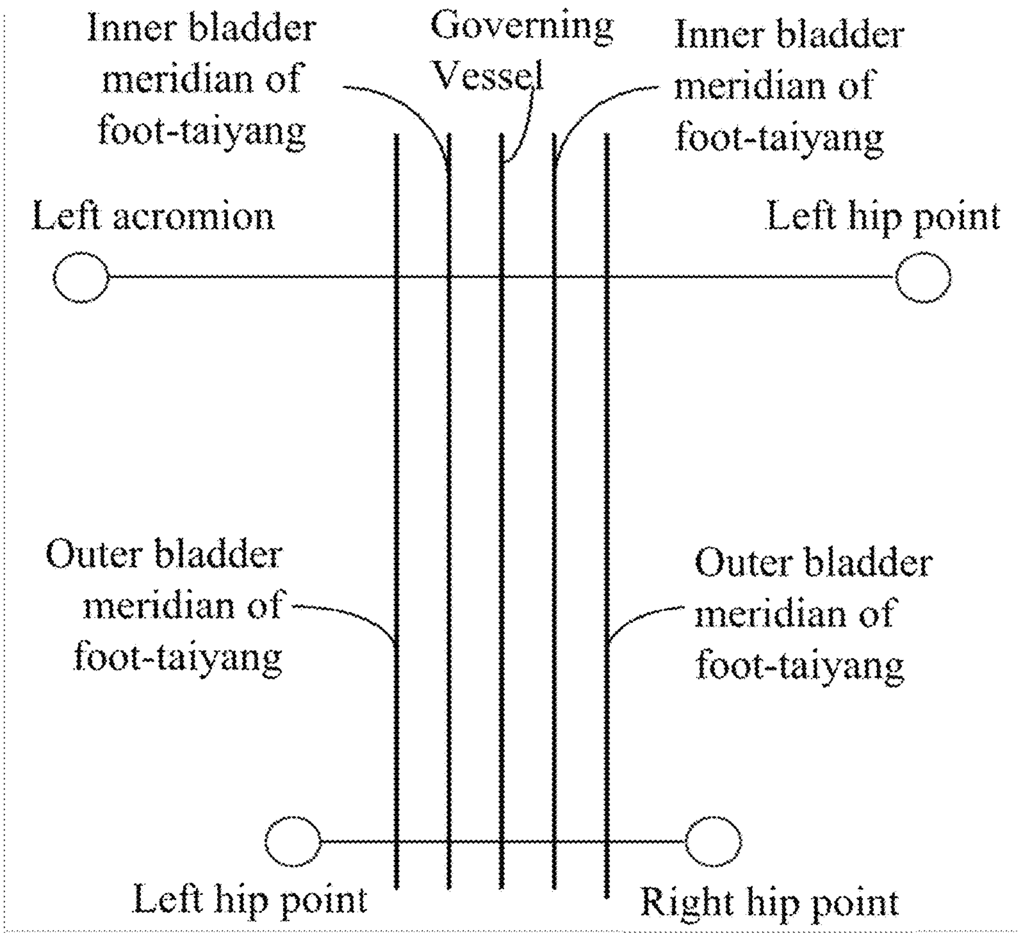
FIG. 4 is a structural schematic diagram of one embodiment of back meridians provided by the present disclosure.

In a specific embodiment of the present disclosure, relationships of the left acromion, the right acromion, the left hip point, the right hip point, the Governing Vessel, the inner bladder meridian of foot-taiyang, and the outer bladder meridian of foot-taiyang are as shown in FIG. 4.

Figure 5:
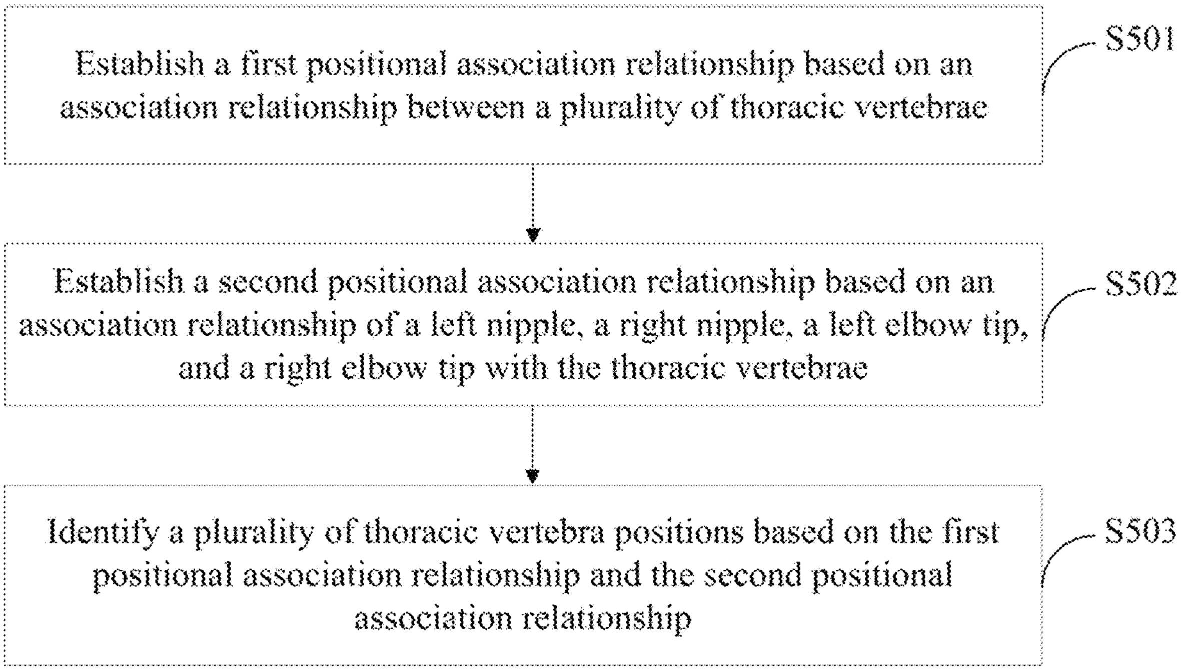
FIG. 5 is a flowchart of one embodiment of identifying thoracic vertebra positions in S103 in FIG. 1 of the present disclosure.

In some embodiments of the present disclosure, the skeleton key feature points further include a left nipple, a right nipple, a left elbow tip, and a right elbow tip; the human body image includes 12 thoracic vertebrae of the back of the human body; and as shown in FIG. 5, identifying the plurality of thoracic vertebra positions in step S103 includes the following steps.

In step S501, a first positional association relationship is established based on an association relationship between a plurality of thoracic vertebrae.

In step S502, a second positional association relationship is established based on an association relationship of the left nipple, the right nipple, the left elbow tip, and the right elbow tip with the thoracic vertebrae.

In step S503, the plurality of thoracic vertebra positions are identified based on the first positional association relationship and the second positional association relationship.

Specifically, a seventh thoracic vertebra is the center of the 12 thoracic vertebrae, and it is assumed that a length difference between each thoracic vertebra and a previous thoracic vertebra is the same. That is, next thoracic vertebra is increased by a length S each time relative to the previous thoracic vertebra. When the length of the first thoracic vertebra is B, the first positional association relationship is as follows:

$$B+(B+S)+(B+2S)+\ldots+(B+6S)=(B+7S)+(B+8S)+(B+9S)\ldots+(B+11S)$$

Thus, the following equation may be derived: 7B+21S=5B+45S, thereby obtaining $$S=\frac{1}{12}B.$$

The second positional association relationship is as follows: a midpoint of a connecting line of the left nipple and the right nipple is flush with the seventh thoracic vertebra, and a midpoint of a connecting line of the left elbow tip and the right elbow tip is flush with an eleventh thoracic vertebra. Therefore, the distance D between the seventh thoracic vertebra and the eleventh thoracic vertebra may be identified according to the left nipple, the right nipple, the left elbow tip, and the right elbow tip. Specifically, the second positional association relationship is as follows:

$$(B+6S)+(B+7S)+(B+8S)+(B+9S)+(B+10S)=D$$

The following equation may be obtained in conjunction with the first positional association relationship:

$$B=\frac{3}{25}D.$$

Thus, each thoracic vertebra position can be identified according to B, (B+S), (B+2S), . . . , (B+11S).

In some embodiments of the present disclosure, the skeleton key feature points further include a navel; the human body image includes 5 lumbar vertebrae of the back of the human body; and identifying the plurality of lumbar vertebra positions in step S103 specifically includes the following steps.

Correspondences of the navel with the lumbar vertebrae are acquired, and the plurality of lumbar vertebra positions are identified based on the correspondences.

Specifically, a fourth lumbar vertebra directly faces the navel; a fifth lumbar vertebra is a position 3 cm below the navel; and a third lumbar vertebra is a position 3 cm above the navel. The distance between every two adjacent lumbar vertebrae is 3 cm. Thus, all the lumbar vertebra positions can be obtained.

Figure 6:
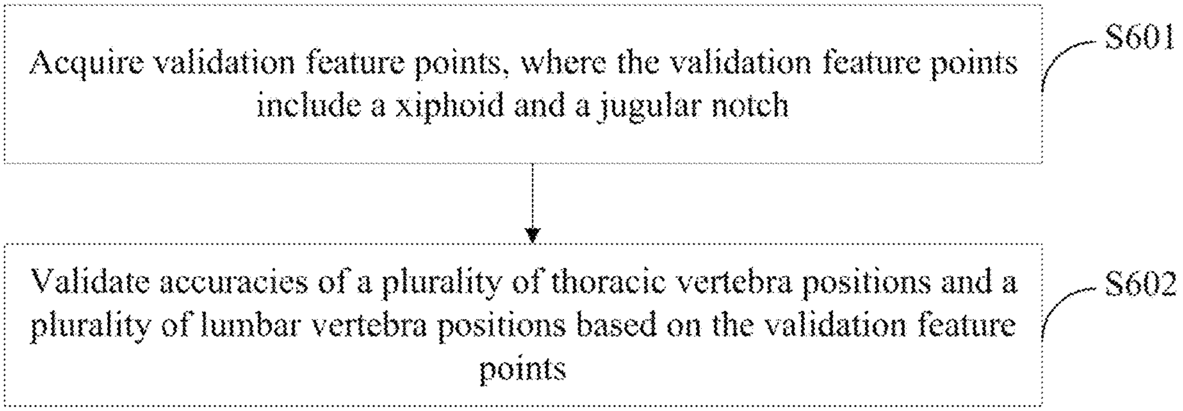
FIG. 6 is a flowchart of one embodiment of validating accuracies of thoracic vertebra positions and lumbar vertebra positions provided by the present disclosure.

Since the identification of the back acupuncture points relies on the thoracic vertebrae and the lumbar vertebrae, the accurate identification of the thoracic vertebra positions and the lumbar vertebra positions is vital for the accurate identification of the back acupuncture points. Therefore, in order to ensure the accuracies of the thoracic vertebra positions and the lumbar vertebra positions, in some embodiments of the present disclosure, prior to step S103, as shown in FIG. 6, the method further includes the following steps.

In step S601, validation feature points are acquired, where the validation feature points include a xiphoid and a jugular notch.

In step S602, accuracies of the plurality of thoracic vertebra positions and the plurality of lumbar vertebra positions are validated based on the validation feature points.

The embodiments of the present disclosure can ensure the accuracies of the thoracic vertebra positions and the lumbar vertebra positions when perform S103 by validating the accuracies of the thoracic vertebra positions and the lumbar vertebra positions with the validation feature points, and thus can ensure the accuracy of the back acupuncture points.

Specifically, the first thoracic vertebra is flush with a midpoint of a connecting line of the xiphoid and the navel. Therefore, the midpoint of the connecting line can be identified based on the xiphoid and the navel, and whether a position difference between the first thoracic vertebra and the midpoint is less than a preset difference is identified. If yes, the position of the first thoracic vertebra is accurate and reliable.

Similarly, the eleventh thoracic vertebra is flush with the xiphoid; the jugular notch is flush with a second thoracic vertebra; and a first thoracic vertebra is located 4 cm above the jugular notch. Therefore, the position reliability of the eleventh thoracic vertebra can be ensured based on the xiphoid, and the position reliability of the second thoracic vertebra and the first thoracic vertebra can be identified based on the jugular notch.

In some embodiments of the present disclosure, step S103 specifically includes the following steps.

Mapping relationships of the back acupuncture points with the plurality of thoracic vertebra positions, the plurality of lumbar vertebra positions, and the back meridians are acquired, and the back acupuncture points are identified based on the mapping relationships.

In a specific embodiment of the present disclosure, the mapping relationships are as shown in Table 1, Table 2, and Table 3. Table 1 shows the back acupuncture points on the Governing Vessel; Table 2 shows the back acupuncture points on the inner bladder meridian of foot-taiyang; and Table 3 shows the back acupuncture points on the outer bladder meridian of foot-taiyang.

TABLE 1

Back Acupuncture Points on Governing Vessel

| Name of Acupuncture Point | Position of Acupuncture Point |
|---|---|
| Yaoyangguan | in the depression under the spinous process of the fourth lumbar vertebra and on the Governing Vessel |
| Mingmen | in the depression under the spinous process of the second lumbar vertebra and on the Governing Vessel |
| Xuanshu | in the depression under the spinous process of the first lumbar vertebra and on the Governing Vessel |
| Jizhong | in the depression under the spinous process of the eleventh thoracic vertebra and on the Governing Vessel |
| Zhongshu | in the depression under the spinous process of the tenth thoracic vertebra and on the Governing Vessel |
| Jinsuo | in the depression under the spinous process of the ninth thoracic vertebra and on the Governing Vessel |
| Zhiyang | in the depression under the spinous process of the seventh thoracic vertebra and on the Governing Vessel |
| Lingtai | in the depression under the spinous process of the sixth thoracic vertebra and on the Governing Vessel |
| Shendao | in the depression under the spinous process of the fifth thoracic vertebra and on the Governing Vessel |
| Shenzhu | in the depression under the spinous process of the third thoracic vertebra and on the Governing Vessel |
| Taodao | in the depression under the spinous process of the first thoracic vertebra and on the Governing Vessel |

TABLE 2

Back Acupuncture Points on Inner Bladder Meridian of Foot-Taiyang

| Name of Acupuncture Point | Position of Acupuncture Point |
|---|---|
| Guanyuanshu (bilaterally symmetrical) | under the spinous process of the fifth lumbar vertebra and on the inner bladder meridian of foot-taiyang |
| Dachangshu (bilaterally symmetrical) | under the spinous process of the fourth lumbar vertebra and on the inner bladder meridian of foot-taiyang |
| Qihaishu (bilaterally symmetrical) | under the spinous process of the third lumbar vertebra and on the inner bladder meridian of foot-taiyang |
| Shenshu (bilaterally symmetrical) | under the spinous process of the second lumbar vertebra and on the inner bladder meridian of foot-taiyang |
| Sanjiaoshu (bilaterally symmetrical) | under the spinous process of the first lumbar vertebra and on the inner bladder meridian of foot-taiyang |
| Weishu (bilaterally symmetrical) | under the spinous process of the twelfth thoracic vertebra and on the inner bladder meridian of foot-taiyang |
| Pishu (bilaterally symmetrical) | under the spinous process of the eleventh thoracic vertebra and the inner bladder meridian of foot-taiyang |
| Danshu (bilaterally symmetrical) | under the spinous process of the tenth thoracic vertebra and on the inner bladder meridian of foot-taiyang |

TABLE 2-continued

| Back Acupuncture Points on Inner Bladder Meridian of Foot-Taiyang | |
|---|---|
| Name of Acupuncture Point | Position of Acupuncture Point |
| Ganshu (bilaterally symmetrical) | under the spinous process of the ninth thoracic vertebra and on the inner bladder meridian of foot-taiyang |
| Geshu (bilaterally symmetrical) | under the spinous process of the seventh thoracic vertebra and on the inner bladder meridian of foot-taiyang |
| Dushu (bilaterally symmetrical) | under the spinous process of the sixth thoracic vertebra and on the inner bladder meridian of foot-taiyang |
| Xinshu (bilaterally symmetrical) | under the spinous process of the fifth thoracic vertebra and on the inner bladder meridian of foot-taiyang |
| Jueyinshu (bilaterally symmetrical) | under the spinous process of the fourth thoracic vertebra and on the inner bladder meridian of foot-taiyang |
| Feishu (bilaterally symmetrical) | under the spinous process of the third thoracic vertebra and on the inner bladder meridian of foot-taiyang |
| Fengmen (bilaterally symmetrical) | under the spinous process of the second thoracic vertebra and on the inner bladder meridian of foot-taiyang |
| Dashu (bilaterally symmetrical) | under the spinous process of the first thoracic vertebra and on the inner bladder meridian of foot-taiyang |

TABLE 3

| Back Acupuncture Points on Outer Bladder Meridian of Foot-Taiyang | |
|---|---|
| Name of Acupuncture Point | Position of Acupuncture Point |
| Zhishi (bilaterally symmetrical) | under the spinous process of the second lumbar vertebra and on the outer bladder meridian of foot-taiyang |
| Yumen (bilaterally symmetrical) | under the spinous process of the first lumbar vertebra and on the outer bladder meridian of foot-taiyang |
| Weicang (bilaterally symmetrical) | under the spinous process of the twelfth thoracic vertebra and on the outer bladder meridian of foot-taiyang |
| Yishe (bilaterally symmetrical) | under the spinous process of the eleventh thoracic vertebra and on the outer bladder meridian of foot-taiyang |
| Yanggang (bilaterally symmetrical) | under the spinous process of the tenth thoracic vertebra and on the outer bladder meridian of foot-taiyang |
| Hunmen (bilaterally symmetrical) | under the spinous process of the ninth thoracic vertebra and on the outer bladder meridian of foot-taiyang |
| Geguan (bilaterally symmetrical) | under the spinous process of the seventh thoracic vertebra and on the outer bladder meridian of foot-taiyang |
| Yixi (bilaterally symmetrical) | under the spinous process of the sixth thoracic vertebra and on the outer bladder meridian of foot-taiyang |
| Shentang (bilaterally symmetrical) | under the spinous process of the fifth thoracic vertebra and on the outer bladder meridian of foot-taiyang |
| Gaoyu (bilaterally symmetrical) | under the spinous process of the fourth thoracic vertebra and on the outer bladder meridian of foot-taiyang |
| Pohu (bilaterally symmetrical) | under the spinous process of the third thoracic vertebra and on the outer bladder meridian of foot-taiyang |
| Fufen (bilaterally symmetrical) | under the spinous process of the second thoracic vertebra and on the outer bladder meridian of foot-taiyang |

The method for identifying back acupuncture points provided in the embodiments of the present disclosure avoids the problem that features cannot be learned well from the back having few texture features, and the problem of inaccurate locating of acupuncture points due to great difficulty, strong subjectivity, and the like of a manual acupuncture point marking process. The locating accuracy and efficiency of the back acupuncture points are improved.

Figure 7:
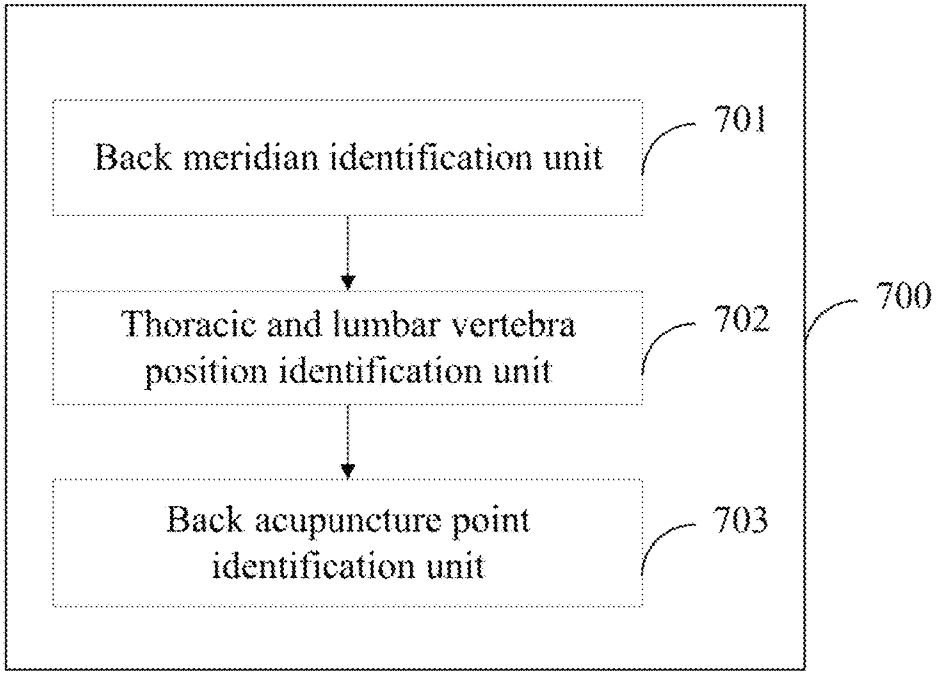
FIG. 7 is a structural schematic diagram of one embodiment of an apparatus for identifying back acupuncture points provided by the present disclosure.

In order to better implement the method for identifying back acupuncture points in the embodiments of the present disclosure, on the basis of the method for identifying back acupuncture points, correspondingly, an embodiment of the present disclosure further provides an apparatus for identifying back acupuncture points. As shown in FIG. 7, the apparatus 700 for identifying back acupuncture points includes:

a back meridian identification unit 701 configured to acquire skeleton key feature points of a human body image, and identify a plurality of back meridians on a back based on the skeleton key feature points;

a thoracic and lumbar vertebra position identification unit 702 configured to identify a plurality of thoracic vertebra positions and a plurality of lumbar vertebra positions of the human body image based on the skeleton key feature points; and a back acupuncture point identification unit 703 configured to identify back acupuncture points based on the plurality of thoracic vertebra positions, the plurality of lumbar vertebra positions, and the back meridians.

The apparatus 700 for identifying back acupuncture points provided in the above embodiment can implement the technical solutions described in the above embodiments of the method for identifying back acupuncture points. The specific implementation principles of the above modules or units may be known with reference to the corresponding contents in the above embodiments of the method for identifying back acupuncture points, which will not be redundantly described here.

Figure 8:
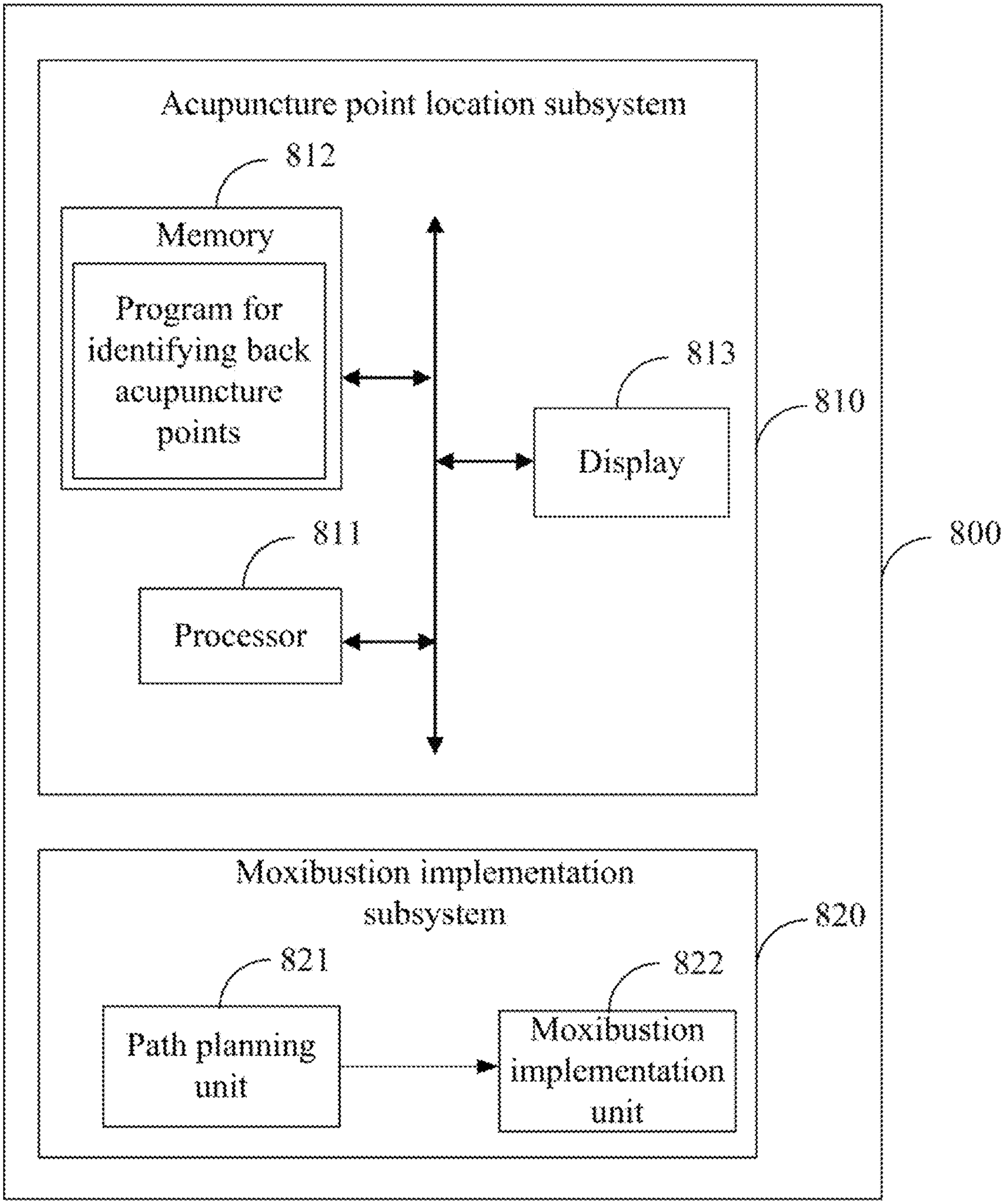
FIG. 8 is a structural schematic diagram of one embodiment of a moxibustion robot provided by the present disclosure.

As shown in FIG. 8, correspondingly, the present disclosure further provides a moxibustion robot 800. The moxibustion robot 800 includes an acupuncture point location subsystem 810 for identifying back acupuncture points and a moxibustion implementation subsystem 820 for applying moxibustion based on the back acupuncture points. The acupuncture point location subsystem 810 includes a processor 811, a memory 812, and a display 813. FIG. 8 only shows part of components of the moxibustion robot 800. However, it should be understood that not all the shown components need to be implemented, and more or less components may be implemented instead.

In some embodiments, the memory 812 may be an internal storage unit of the acupuncture point location subsystem 810, for example, a hard disk or an internal storage of the acupuncture point location subsystem 810. In some other embodiments, the memory 812 may also be an external storage device of the acupuncture point location subsystem 810, such as a plug-in hard disk, a smart media card (SMC), a secure digital (SD) card, or a flash card that is equipped on the acupuncture point location subsystem 810.

Further, the memory 812 may include both an internal storage unit and an external storage device of the acupuncture point location subsystem 810. The memory 812 is configured to store and install application software and various types of data of the acupuncture point location subsystem 810.

In some embodiments, the processor 811 may be a central processing unit (CPU), a microprocessor, or other data processing chips, and is configured to run a program code stored in the memory 812 or process data, e.g., the method for identifying back acupuncture points in the present disclosure.

In some embodiments, the display 813 may be a light-emitting diode (LED) display, a liquid crystal display, a touch liquid crystal display, an organic light-emitting diode (OLED) touch device, etc. The display 813 is configured to display the information of the acupuncture point location subsystem 810 and to display a visual user interface. Components 811-813 of the acupuncture point location subsystem 810 communicate with one another through a system bus.

In some embodiments of the present disclosure, when the processor 811 executes a program for identifying back acupuncture points in the memory 812, the following steps may be implemented.

Skeleton key feature points of a human body image are acquired, and a plurality of back meridians on a back are identified based on the skeleton key feature points.

A plurality of thoracic vertebra positions and a plurality of lumbar vertebra positions of the human body image are identified based on the skeleton key feature points.

Back acupuncture points are identified based on the plurality of thoracic vertebra positions, the plurality of lumbar vertebra positions, and the back meridians.

It should be understood that when the processor 811 executes the program for identifying back acupuncture points in the memory 812, in addition to the above functions, other functions may also be implemented, as specifically described in the foregoing related method embodiments.

As shown in FIG. 8, the moxibustion implementation subsystem 820 includes a path planning unit 821 and a moxibustion implementation unit 822. The path planning unit 821 is configured to plan a path according to a position of an acupuncture needle in the moxibustion implementation unit 822 and coordinates of the back acupuncture points to generate a planned path. The moxibustion implementation unit 822 is configured to move the acupuncture needle to the positions of the back acupuncture points according to the planned path.

The moxibustion robot 800 provided in the embodiments of the present disclosure can perform the moxibustion treatment for a long time instead of a doctor. The burden of the doctor can be reduced and the medical consumption can be reduced.

Correspondingly, an embodiment of the present disclosure further provides a computer-readable storage medium configured to store computer-readable programs or instructions which, when executed, can implement the steps or functions of the method for identifying back acupuncture points provided in the above method embodiments.

Those skilled in the art can understand that relevant hardware (such as a processor and a controller) can be instructed by computer programs to implement all or part of processes of the method of the above embodiments, and the computer programs can be stored in the computer-readable storage medium. The computer-readable storage medium is a magnetic disk, an optical disk, a read-only memory (ROM), a random access memory (RAM), or the like.

The method for identifying back acupuncture points, and the moxibustion robot provided in the present disclosure are described above in detail. Several examples are used herein for illustration of the principles and implementations of the present disclosure. The description of the above embodiments is used to help understand the method of the present disclosure and its core ideas. Meanwhile, those skilled in the art can make changes to the specific implementations and the application scope according to the ideas of the present disclosure. In conclusion, the contents of the specification shall not be construed as limitations to the present disclosure.

What is claimed is:

1. A method for identifying back acupuncture points, comprising:

acquiring skeleton key feature points of a human body image, and identifying a plurality of back meridians on a back based on the skeleton key feature points;

identifying a plurality of thoracic vertebra positions and a plurality of lumbar vertebra positions of the human body image based on the skeleton key feature points; and identifying back acupuncture points based on the plurality of thoracic vertebra positions, the plurality of lumbar vertebra positions, and the back meridians;

wherein the skeleton key feature points comprise a left acromion, a right acromion, a left hip point, and a right hip point; the back meridians comprise a Governing Vessel, an inner bladder meridian of foot-taiyang, and an outer bladder meridian of foot-taiyang; and the identifying a plurality of back meridians on a back based on the skeleton key feature points comprises:

identifying a first midpoint between the left acromion and the right acromion and a second midpoint between the left hip point and the right hip point;

taking a connecting line of the first midpoint and the second midpoint as the Governing Vessel; and identifying the inner bladder meridian of foot-taiyang and the outer bladder meridian of foot-taiyang based on a topological relationship of the Governing Vessel with the inner bladder meridian of foot-taiyang and the outer bladder meridian of foot-taiyang;

the topological relationship comprises a first distance relationship between the Governing Vessel and the inner bladder meridian of foot-taiyang and a second distance relationship between the Governing Vessel and the outer bladder meridian of foot-taiyang; and the identifying the inner bladder meridian of foot-taiyang and the outer bladder meridian of foot-taiyang based on a topological relationship of the Governing Vessel with the inner bladder meridian of foot-taiyang and the outer bladder meridian of foot-taiyang comprises:

acquiring an actual pixel distance and a theoretic distance between the left acromion and the right acromion;

using a ratio of the actual pixel distance to the theoretic distance as a horizontal cun;

separately adjusting the first distance relationship and the second distance relationship based on the horizontal cun to correspondingly obtain a first calibration relationship and a second calibration relationship; and identifying the inner bladder meridian of foot-taiyang based on the first calibration relationship, and identifying the outer bladder meridian of foot-taiyang based on the second calibration relationship;

wherein the first distance relationship is that a distance between the inner bladder meridian of foot-taiyang and the Governing Vessel is 1.5 cun, and the second distance relationship is that a distance between the outer bladder meridian of foot-taiyang and the Governing Vessel is 3 cun;

the skeleton key feature points further comprise a left nipple, a right nipple, a left elbow tip, and a right elbow tip; the human body image comprises 12 thoracic vertebrae of the back of the human body; and the identifying a plurality of thoracic vertebra positions of the human body image based on the skeleton key feature points comprises:

establishing a first positional association relationship based on an association relationship between a plurality of thoracic vertebrae;

establishing a second positional association relationship based on an association relationship of the left nipple, the right nipple, the left elbow tip, and the right elbow tip with the thoracic vertebrae; and identifying the plurality of thoracic vertebra positions based on the first positional association relationship and the second positional association relationship;

the first positional association relationship is as follows:

$$B+(B+S)+(B+2S)+ \ldots +(B+6S)=(B+7S)+(B+8S)+(B+9S)+(B+11S)$$

the second positional association relationship is as follows:

$$(B+6S)+(B+7S)+(B+8S)+(B+9S)+(B+10S)=D$$

wherein B represents a length of a first thoracic vertebra; S represents a length difference between two adjacent thoracic vertebrae; and D represents a distance between a midpoint of a connecting line of the left nipple and the right nipple and a midpoint of a connecting line of the left elbow tip and the right elbow tip;

the skeleton key feature points further comprise a navel; the human body image comprises 5 lumbar vertebrae of the back of the human body; and the identifying a plurality of lumbar vertebra positions of the human body image based on the skeleton key feature points comprises:

acquiring correspondences of the navel with the lumbar vertebrae, and identifying the plurality of lumbar vertebra positions based on the correspondences;

wherein a fourth lumbar vertebra directly faces the navel; a fifth lumbar vertebra is a position 3 cm below the navel; a third lumbar vertebra is a position 3 cm above the navel; and a distance between every two adjacent lumbar vertebrae is 3 cm.

2. The method for identifying back acupuncture points according to claim 1, before the identifying back acupuncture points based on the plurality of thoracic vertebra positions, the plurality of lumbar vertebra positions, and the back meridians, further comprising:

acquiring validation feature points, wherein the validation feature points comprise a xiphoid and a jugular notch; and validating accuracies of the plurality of thoracic vertebra positions and the plurality of lumbar vertebra positions based on the validation feature points.

3. The method for identifying back acupuncture points according to claim 1, wherein the identifying back acupuncture points based on the plurality of thoracic vertebra positions, the plurality of lumbar vertebra positions, and the back meridians comprises:

acquiring mapping relationships of the back acupuncture points with the plurality of thoracic vertebra positions, the plurality of lumbar vertebra positions, and the back meridians, and identifying the back acupuncture points based on the mapping relationships.

4. An apparatus for identifying back acupuncture points, comprising:

a back meridian identification unit configured to acquire skeleton key feature points of a human body image, and identify a plurality of back meridians on a back based on the skeleton key feature points;

a thoracic and lumbar vertebra position identification unit configured to identify a plurality of thoracic vertebra positions and a plurality of lumbar vertebra positions of the human body image based on the skeleton key feature points; and a back acupuncture point identification unit configured to identify back acupuncture points based on the plurality of thoracic vertebra positions, the plurality of lumbar vertebra positions, and the back meridians;

wherein the skeleton key feature points comprise a left acromion, a right acromion, a left hip point, and a right hip point; the back meridians comprise a Governing Vessel, an inner bladder meridian of foot-taiyang, and an outer bladder meridian of foot-taiyang; and the identifying a plurality of back meridians on a back based on the skeleton key feature points comprises:

identifying a first midpoint between the left acromion and the right acromion and a second midpoint between the left hip point and the right hip point;

taking a connecting line of the first midpoint and the second midpoint as the Governing Vessel; and identifying the inner bladder meridian of foot-taiyang and the outer bladder meridian of foot-taiyang based on a topological relationship of the Governing Vessel with the inner bladder meridian of foot-taiyang and the outer bladder meridian of foot-taiyang;

the topological relationship comprises a first distance relationship between the Governing Vessel and the inner bladder meridian of foot-taiyang and a second distance relationship between the Governing Vessel and the outer bladder meridian of foot-taiyang; and the identifying the inner bladder meridian of foot-taiyang and the outer bladder meridian of foot-taiyang based on a topological relationship of the Governing Vessel with the inner bladder meridian of foot-taiyang and the outer bladder meridian of foot-taiyang comprises:

acquiring an actual pixel distance and a theoretic distance between the left acromion and the right acromion;

using a ratio of the actual pixel distance to the theoretic distance as a horizontal cun;

separately adjusting the first distance relationship and the second distance relationship based on the horizontal cun to correspondingly obtain a first calibration relationship and a second calibration relationship; and identifying the inner bladder meridian of foot-taiyang based on the first calibration relationship, and identifying the outer bladder meridian of foot-taiyang based on the second calibration relationship;

wherein the first distance relationship is that a distance between the inner bladder meridian of foot-taiyang and the Governing Vessel is 1.5 cun, and the second distance relationship is that a distance between the outer bladder meridian of foot-taiyang and the Governing Vessel is 3 cun;

the skeleton key feature points further comprise a left nipple, a right nipple, a left elbow tip, and a right elbow tip; the human body image comprises 12 thoracic vertebrae of the back of the human body; and the identifying a plurality of thoracic vertebra positions of the human body image based on the skeleton key feature points comprises:

establishing a first positional association relationship based on an association relationship between a plurality of thoracic vertebrae;

establishing a second positional association relationship based on an association relationship of the left nipple, the right nipple, the left elbow tip, and the right elbow tip with the thoracic vertebrae; and identifying the plurality of thoracic vertebra positions based on the first positional association relationship and the second positional association relationship;

the first positional association relationship is as follows:

$$B+(B+S)+(B+2S)+ \ldots +(B+6S)=(B+7S)+(B+8S)+(B+9S) \ldots +(B+11S)$$

the second positional association relationship is as follows:

$$(B+6S)+(B+7S)+(B+8S)+(B+9S)+(B+10S)=D$$

wherein B represents a length of a first thoracic vertebra; S represents a length difference between two adjacent thoracic vertebrae; and D represents a distance between a midpoint of a connecting line of the left nipple and the right nipple and a midpoint of a connecting line of the left elbow tip and the right elbow tip;

the skeleton key feature points further comprise a navel; the human body image comprises 5 lumbar vertebrae of the back of the human body; and the identifying a plurality of lumbar vertebra positions of the human body image based on the skeleton key feature points comprises:

acquiring correspondences of the navel with the lumbar vertebrae, and identifying the plurality of lumbar vertebra positions based on the correspondences;

wherein a fourth lumbar vertebra directly faces the navel; a fifth lumbar vertebra is a position 3 cm below the navel; a third lumbar vertebra is a position 3 cm above the navel; and a distance between every two adjacent lumbar vertebrae is 3 cm.

5. A moxibustion robot, comprising an acupuncture point location sub system for identifying back acupuncture points and a moxibustion implementation sub system for applying moxibustion based on the back acupuncture points, wherein the acupuncture point location sub system comprises a memory and a processor;

the memory is configured to store a program; and the processor is coupled with the memory and configured to execute the program stored in the memory to implement the steps of the method for identifying back acupuncture points according to claim 1.

6. A moxibustion robot, comprising an acupuncture point location sub system for identifying back acupuncture points and a moxibustion implementation sub system for applying moxibustion based on the back acupuncture points, wherein the acupuncture point location subsystem comprises a memory and a processor, the memory is configured to store a program; and the processor is coupled with the memory and configured to execute the program stored in the memory to implement the steps of the method for identifying back acupuncture points according to claim 2.

7. A moxibustion robot, comprising an acupuncture point location sub system for identifying back acupuncture points and a moxibustion implementation sub system for applying moxibustion based on the back acupuncture points, wherein the acupuncture point location subsystem comprises a memory and a processor, the memory is configured to store a program; and the processor is coupled with the memory and configured to execute the program stored in the memory to implement the steps of the method for identifying back acupuncture points according to claim 3.

* * * * *